United States Patent
Schoen

[11] Patent Number: 4,927,251
[45] Date of Patent: May 22, 1990

[54] SINGLE PASS PHASE CONJUGATE ABERRATION CORRECTING IMAGING TELESCOPE

[76] Inventor: Neil C. Schoen, 9817 Freestate Pl., Gaithersburg, Md. 20879

[21] Appl. No.: 205,926

[22] Filed: Jun. 13, 1988

[51] Int. Cl.$^5$ .......................................... G02B 23/06
[52] U.S. Cl. ................................ 350/503; 350/505; 350/537; 350/620; 350/321; 350/354
[58] Field of Search ............... 350/503, 504, 505, 507, 350/537, 163, 501, 162.12, 3.85, 3.64, 620, 321, 354

[56] References Cited

U.S. PATENT DOCUMENTS

| | | | |
|---|---|---|---|
| 4,102,572 | 7/1978 | O'Meara | 356/5 |
| 4,674,824 | 6/1987 | Goodman et al. | 350/3.64 |
| 4,728,165 | 3/1988 | Powell et al. | 350/3.64 |

OTHER PUBLICATIONS

G. Martin et al., "Generation of Time-Reversed . . . Beam", *Optics Letters*, vol. 5, No. 5, May, 1980, pp. 185–187.

M. D. Levenson, "High-Resolution Imaging by Wave-Front Conjugation", *Optics Letters*, vol. 5, No. 5, May, 1980, pp. 182–184.

*Primary Examiner*—Jon W. Henry

[57] ABSTRACT

A technique for correcting wave front aberrations in large optical telescopes by four wave mixing processes which allow near-diffraction limited performance in the presence of relatively large physical distortions which could be present in low cost lightweight primary mirrors of desired high resolution imaging instruments. A local source reference beam, which is used to sample the aberrations in the telescope optical train, is mixed with the incoming image beam, which can be filtered and can be at a slightly different wavelength than the aberrated reference beam; a corrected image wave front is then extracted and brought to a focus and recorded as the desired high resolution image. A non-linear optical material is the medium used to permit either degenerate or non-degenerate four wave mixing processes to occur, with the aberrated reference beam as the pump wave which in effect subtracts the instrument wave front aberrations from the incoming image beam, thereby producing a high resolution image free from the aberrations present in the instrument optics. This technique allows the construction of very large optical elements in an inexpensive fashion, since surface tolerances can be relaxed greatly due to the phase correction process in the non-linear optical mixing media. The use of appropriate non-linear media for microwave and millimeter wave spectral regions allow these techniques to be applied to correct aberrations in large radar antennas. This could result in inexpensive, space-based millimeter wave imaging systems.

8 Claims, 7 Drawing Sheets

SINGLE PASS PHASE CONJUGATE ABERRATION CORRECTING IMAGING TELESCOPE

INTRODUCTION

Present day high resolution imaging telescopes are constrained in size because of the costs of fabricating high precision mirror surfaces. The cost of fabricating large astronomical telescope mirrors by conventional methods has empirically been determined to scale approximately as the third power of the mirror diameter. Under these conditions, telescopes above 2-3 meters become prohibitively expensive. In addition, the weight of the primary mirror becomes a factor when the telescope is to be used in space, since costs to orbit are dependent on weight, and as the mirror diameter increases, volume also becomes a constraining parameter for a monolithic structure.

There are several attempts in progress to reduce the cost and weight of large telescope mirrors. Lightweight honeycomb structures are being developed to reduce the weight of large mirrors while retaining structural stiffness. However, extensive grinding and polishing processes must still be done, keeping costs high. Newer techniques, such as adaptive optics, are also being utilized. An adaptive primary mirror can be constructed using piezoelectric actuators to create deformations in a thin mirror surface to change the shape of the primary surface. This approach is currently used to correct atmospheric aberrations and requires a wave front sensor to sample the phase front of an incoming reference wave and distort the primary mirror to remove any aberrations caused by the atmosphere. Theoretically, it could be used to dynamically measure the mirror configuration and correct any positional distortions. There are several problem areas connected with this technique. Conventional adaptive optics telescopes use reference waves as distant as objects to be imaged, so that the reference phase front is flat. This places signal to noise constraints on the wave front sensor, due to the division of the aperture and the limited number of photons incoming. The local reference technique used in the present invention could alleviate this problem. However, the adaptive systems are quite complex and costly to use when no external aberrations (such as the atmosphere) are present. It is thus apparent that a technique that could correct structural aberrations farther down the optical train near the focal plane would be valuable, since the structural requirements could then be relaxed, allowing cheap and lightweight materials to be used to construct larger mirrors without concern for precise surface figure.

The present invention accomplishes this objective by using the non-linear optical phase conjugation properties of materials with high third order non-linear susceptibilities; three and four wave mixing processes can produce the needed phase front modification to correct optical train induced aberrations. Four wave mixing and other non-linear optical phase conjugation processes have been used to correct atmospheric distortions, but these applications have required a return path through the aberrating medium and thus have not been used for imaging but for propagating laser beams without distortion. A key feature in the present invention is the use of a local reference beam to sample the aberrations of the optics system. The reference beam and the image beam can be separated by geometrical (angular) factors, or by slightly different frequencies, or by polarization effects. By imposing the aberrations on the reference beam, a return path through the aberrations becomes unnecessary for correcting the distortion, thus making practical a system to correct optical aberrations near the focal plane of the imaging device.

SUMMARY OF THE INVENTION

The local reference aberration correction system described herein utilizes four wave mixing (FWM) processes in non-linear optical materials to clean up aberrations/distortions present in the image beam of large optical telescopes due to instrumental phase errors introduced into the image beam by optical surface distortions. The ability to remove the effects of these distortions should allow the construction of large, inexpensive optical primary elements, since advantage can be taken of the lower weights and processing costs inherent in the use of low precision optical surfaces, while retaining near-diffraction limited performance. The basic features of this local reference system rely on the presence of three input beams; the image beam containing the image and the optical train aberrations (IA), the reference beam, ideally a plane wave with the optical aberrations included (RA), and finally, the pump beam (P), also provided locally. In essence, the non-linear properties of an optical material are used to produce a phaselocking of the reference and image beams such that the phase conjugate reference beam phase is subtracted from the image beam, thus removing the distortions. This is accomplished by the four wave mixing process as follows: The mixing of the three waves in the non-linear material results in a term, the product of the three waves, which results in the emergence of the fourth beam (IC) which is corrected for the phase aberrations. The appropriate term is $$IC = \psi_3(P)(RA^*)(IA)$$

where $\psi_3$ is the non-linear third-order susceptibility of the medium and (RA*) is the complex conjugate of the aberrated reference beam. Since RA* is just $Re^{-i\phi}$ and IA is $Ie^{i\phi}$, where R and I are the unaberrated reference and image beam and $\phi$ is the phase aberration of the optical train, the phase conjugate return wave IC becomes $$IC = \psi_3(P)(R^*)(I) = RI$$

since $\psi_3(P)(R^*)$ is a constant since the pump wave and the complex conjugate reference wave are identical sources. Thus, the corrected image wave (IC) is proportional to the unaberrated image wave (1); i.e., the four wave mixing leads to an unaberrated image beam *without* a double traversal of the optical train as is usual in phase conjugate systems. In order to develop a practical device, a geometry that allows easy separation of the individual beams to extract the appropriate phase conjugated beam is necessary. This can be done in several ways. The simplest is to introduce small angular differences in the beams, such that the image corrected beam scatters off the non-linear material in a slightly different direction and can thus be separated from similar wavelength reference beams. Alternately, polarization differences, combined with polarized beam splitters can be utilized. Also, a non-degenerate FWM process can be used, in which the reference beam and image beam are at slightly different frequencies. Filters can then also be used to select the appropriate image-corrected beam.

The use of the techniques described in this invention should allow the construction of inexpensive large optical telescopes which will automatically correct for the reduced tolerances used in construction. This would result in a considerable advance over conventional adaptive optics ("rubber mirror") systems or techniques for segmented telescope construction.

DESCRIPTION OF THE PREFERRED EMBODIMENTS

The following descriptions of this invention are selected to illustrate in sufficient detail for comprehension the key elements of this technique which are necessary to correct images aberrated by instrumental distortions in large optical telescopes; these key elements help present the novel features which also distinguish this invention from prior art, and also are thought to be the most straight-forward and practical configurations. However, it is obvious from examining the current literature that there are many materials with non-linear susceptibilities suitable for use in four wave mixing (FWM) devices, as well as numerous optical configurations which will produce acceptable performance. Therefore, even though configurations thought to be practical alternatives will be mentioned where appropriate, it is not intended that the present descriptions or configurations limit the scope or potential embodiments of this invention.

Figure 1:
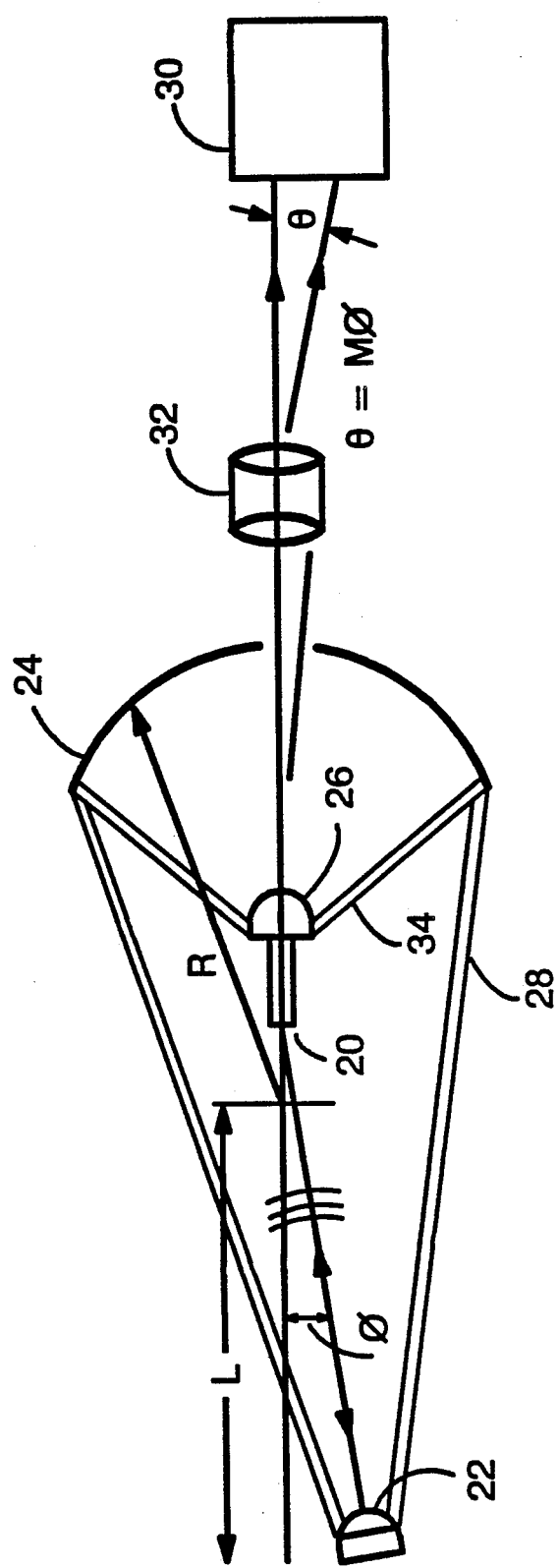
FIG. 1 is a schematic of a large telescope system with aberration correcting subsystems, including a local reference laser with strut-mounted reflector to provide an aberrated reference beam with angular separation from the image beam, and a non-linear optics subsystem to remove the telescope aberration from the image beam by utilization of the phase conjugation properties of selected non-linear optical media.

In the discussions that follow, critical issues/essential elements will be described in the order in which the image wave passes through the system; i.e., from the telescope primary region, through the additional four wave mixing optics, to the focal plane where the corrected image is available for recording. A Cassegranian telescope configuration is assumed, since this is a standard form for large space-based telescopes and also allows compact mounting and lightweight support for the local reference source/optics. FIG. 1 shows the front-end geometry and the reference configuration for discussions of the local reference function and alignment issues.

The local reference source, provided by a laser 20 and a reflector 22, produces a uniform phased wave which impinges on the telescope primary mirror 24 and samples the aberrations present in the low cost/lightweight primary. The ray optics of the primary are governed by the standard equation $$\frac{1}{o} + \frac{1}{i} = \frac{2}{R}$$

where R is the radius of curvature of the primary mirror and i and o are the image and object locations. For a distant object ($o \approx \infty$), the image forms at $i = R/2$ or the focal point of the primary. A secondary mirror 26 reflects the incoming beam back through the hole in the center of the primary to the optical train. The first requirement placed on the reference beam is that the fully sampled primary mirror surface be totally reflected by the secondary mirror. If we assume that the central obscuration of the primary is to be less than the order of 0.2 of the primary aperture diameter, then this places a minimum separation distance for the effective location of the spherical reference beam as measured from the primary center. This limiting case occurs when the secondary diameter is D/5 and is located at the focal point of the primary. Using an f/1 system (f=R/2=D) and the standard ray equation, one finds that the reference source should be approximately five focal lengths (5f) upstream of the primary mirror if the secondary mirror is to intercept the entire reference beam wavefront which has reflected off of the primary mirror surface. If the reference beam originates at a distance of 10f, then the image beam and the reference beam have diameters (at the secondary mirror surface) that differ only by about 5%. It is not necessary that the beams overlap exactly in any case, since the image and reference beam are separated further back in the optical train; it is only necessary that the entire primary mirror surface be sampled and fully transmitted to the four wave mixer. Also, if the secondary mirror is optically precise, then it will not introduce aberrations that will require correction, and therefore, full sampling of this mirror by either image or reference beam is not necessarily required. For example, placing the secondary behind the focal point allows full illumination of image (inverted) and reference beams. Alternate configurations for the reference beam may be necessary if a particular application favors a different telescope configuration, such as a Newtonian or Coude for example. Also, unconventional primary geometries, such as dual focal region elliptical mirrors, may provide more compact optical paths for illuminating the primary surface aberrations with a reference wave front.

Given that the reference laser/reflector system produces a perfect spherical wave impinging on the primary mirror, one has to consider how accurately the mirror aberrations are sampled, since the reference beam is spherical and the image beam is a plane wave. This means that at certain locations on the primary mirror, the two beams have phase fronts at different angles to the local surface. The maximum effect takes place at the edge of the primary, and can be calculated for the f/1 geometry previously assumed. If the arc length of the mirror as measured on a plane passing through the center axis is approximated by the diameter D, then the half angle subtended at the center of curvature is $$\theta_M = \frac{1}{2}\left(\frac{R}{2}\right)\frac{1}{R} = \frac{1}{4} \simeq 15°.$$

This means that a tangent to the mirror surface at the edge makes an angle of 15° to the reference surface of an incoming image plane wave phase front.

If we consider the case with the reference beam located at 5f as before, a similar calculation shows a tangent angle to this spherical surface of $$\theta' = \frac{1}{2}\left(\frac{R}{2}\right)/5\left(\frac{R}{2}\right) = \frac{1}{10} \simeq 6°.$$

Therefore, the plane image wave and the reference wave strike the mirror edge with angular difference of $\Delta = 6°$ and thus see slightly different phase aberrations. If an effective reference center of 10f is used, this angular difference shrinks to a maximum of $\Delta = 3°$ at the mirror edge. The most severe sample errors occur for aberrations with high spatial frequencies (for example, rectangular surface grooves such as those produced in spectrograph gratings, etc.) For a step-function-like change in mirror surface height, the spreading $\delta$ induced by the angular differences $\Delta$ just described scales as $\delta = H\sin\Delta$, where H is the height of the aberration. If the spatial frequency of the mirror aberrations is large compared to $\delta$, then these effects will be insignificant.

Consider now problems of structured alignment and vibrational oscillations associated with a large structure such as depicted in FIG. 1. It is necessary that the vibrational/thermal deflections of the reference beam reflector (or compact laser if similarly mounted) are small compared to the offset angle $\phi$ of the reference beam. This will allow separation of reference and image beams in the four wave mixing section 30 of the optical train. The long struts 28 are subject to uneven thermal heating in space-based environments, as well torques and vibrations due to telescope slewing and mechanical oscillations. A single solid strut under a transverse thermal gradient of dT will acquire a radius of curvature of $R \simeq d/(\alpha dT)$ where d is one half the thickness and $\alpha$ is the linear expansion coefficient. If a low expansion material is utilized ($\alpha < 0.02 \times 10^{-5}/°C$), then angular deviations from end-to-end can be kept to the order of several tenths of degrees (0.1°–0.5°) for 50 meter lengths for temperature gradients of the order of 10° C. When the struts are connected in a pyrimidal fashion as shown in FIG. 1, the angular deflection is greatly reduced (by factors of >8) to yield deflections of the order of 0.01°/C°. An analysis of the dynamics of the pyramidal structure yields resonant frequencies of $$\omega_1 = \sqrt{\frac{6EI}{ml^2}} \quad \text{single strut}$$

$$\omega_2 = \sqrt{\frac{2E}{\rho}} \; \frac{R}{4l^2} \quad \text{planar triangular truss}$$

and deflections of $$dx_1 = \frac{1}{8}\frac{ml^3}{EI} \quad \text{single strut (1-g force)}$$

$$dx_2 = \frac{4mgl^3}{24AER^2} \quad \begin{array}{l}\text{planar triangular truss}\\ \text{(1-g force in plane)}\end{array}$$

where E is Young's modulus, m is the mass (density $\rho$) of the struts, I the area moment of inertia, and l the length of the struts. For a single strut of carbon ($E = 2.75 \times 10^{12}$ dynes/cm$^2$, 10 cm diameter), the single beam deflection for a 50 meter length is about 12 cm, leading to an angular deviation of ~1.3°. However, a planar triangular truss (2 struts) reduces this deflection by a factor of 8 to about 0.15°. By using hollow truss members and going to three struts, it should be possible to reduce these deflections by an order of magnitude.

Thus, using parameters for typical spacecraft material (lightweight/rigid) yields deflections of the order of 0.015°, for 1-g loads/torques and vibration frequencies of the order of 10 Hertz. Calculations that follow indicate that reference beam offsets of 0.1–1.0° are compatible with the requirements generated by the four wave mixing materials. Therefore, it appears that thermal/mechanical distortions are sufficiently small to permit telescope construction without elaborate active structural control mechanisms. Alternate approaches would be a passive damping system, a simple active control system for the small reflector, or a free-flying reference source with no support structure but connected by tether for control.

Figure 2:
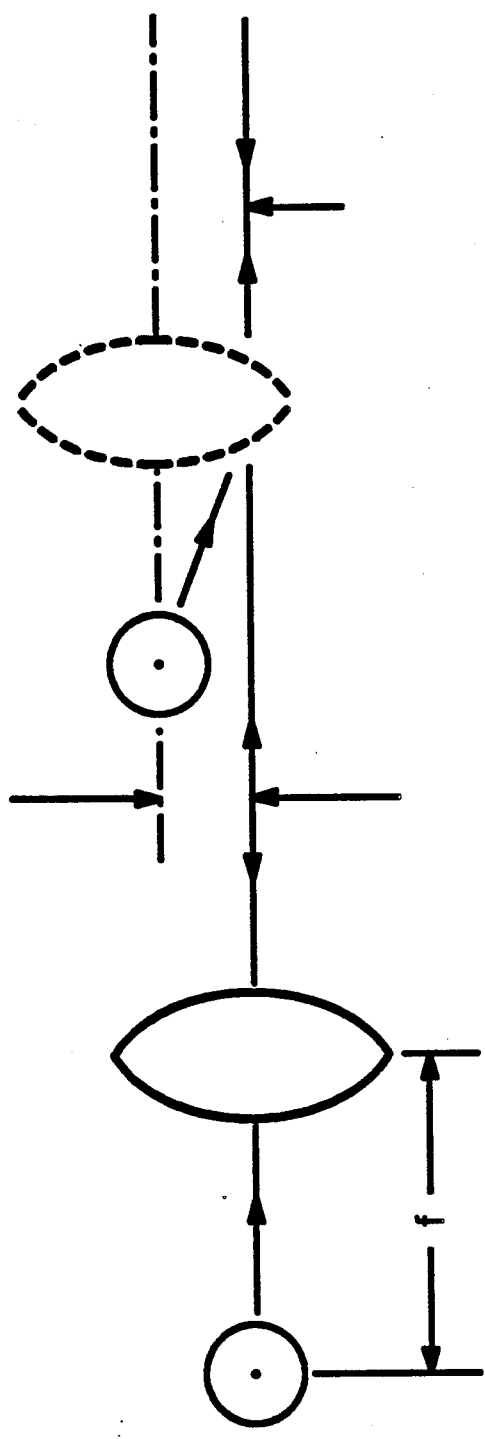
FIG. 2 is a schematic of an optical configuration to maintain the angular orientation of the reference beam when lateral vibrations of the reflecting mirror are present.

Finally, an optical system for the reflector can be designed so that either rotational or lateral displacements will be automatically compensated. An example of compensation for lateral displacements is shown in FIG. 2 using only a lens and a spherical reflector.

Figure 3:
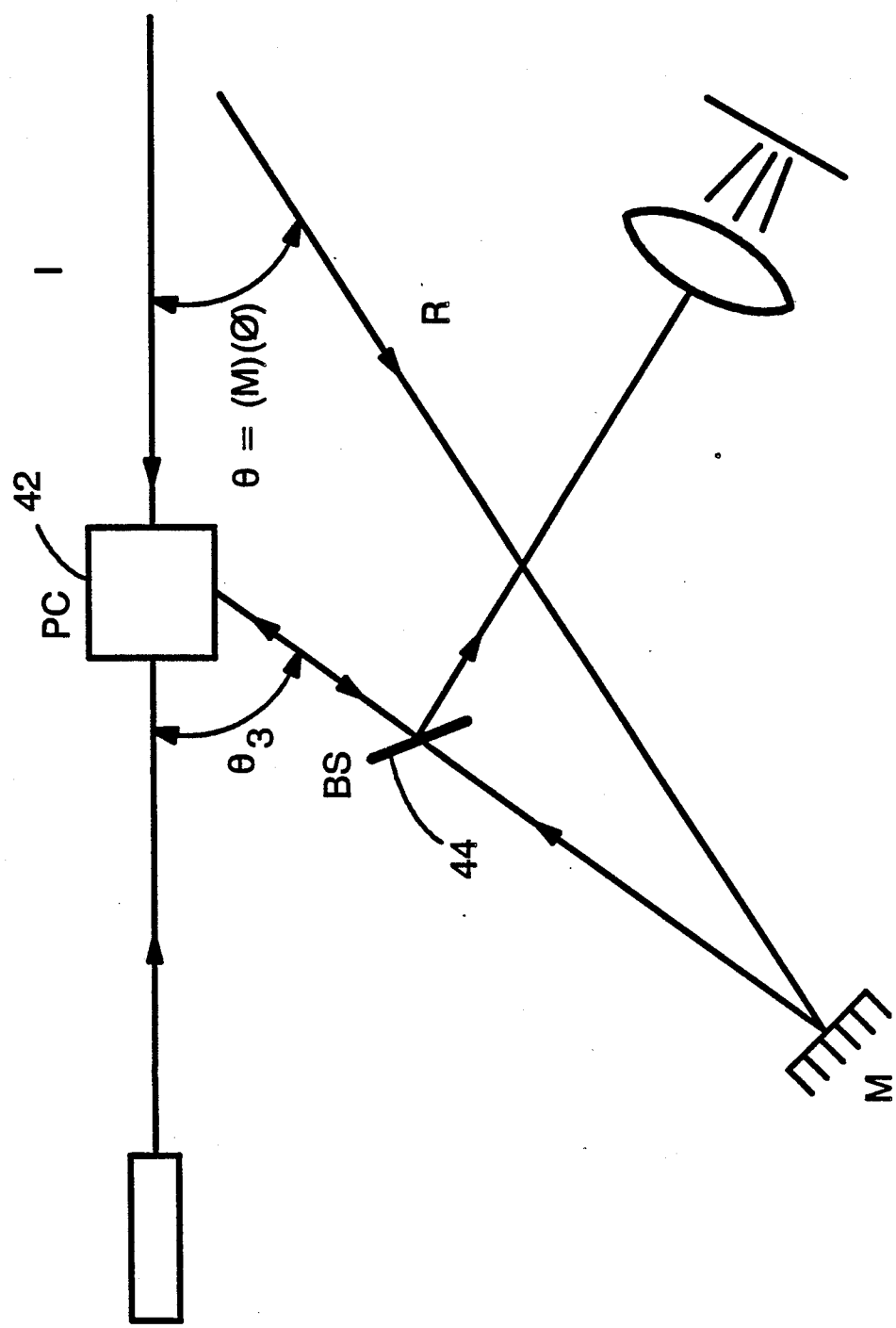
FIG. 3 is an optical configuration in which the aberrated reference beam acts as the probe wave in a four wave mixing process while the image beam acts as one of the pump waves.

The four wave mixing section of the optical train represents the unique aspects of this approach to aberration-corrected large telescopes. A schematic utilizing a transmissive FWM material is shown in FIG. 3. The telescope system shown in FIG. 1, consisting of a primary mirror 24 with focal length f=R/2 and an ocular system 32 with focal length $F_o$ produces an angular magnification $M = R/2F_o$. Typical astronomical telescopes have magnifications ranging from 10 to 300. For the following calculations, the magnification M=50 will be assumed. This means that angular differences of $\phi = 0.1°–1°$ in the reference/image beams result in an angular separation of $\theta = 5°–50°$ at the exit of the telescope ocular section, allowing easy access to the two beams for use in the four wave mixer, as shown in FIG. 3 wherein PC 42 is a phase conjugating material and BS 44 is a transmissive type beam splitter. This configuration allows both the reference beam and image beam to make a *single* pass through the aberration source (telescope optics) and therefore is significantly different than other four wave mixing configurations that require a *double* pass through the aberrating element(s). The following calculations will address feasibility/practicability issues such as conjugate reflectivity/signal strength, alignment tolerances, and bandwidth considerations.

Figure 4:
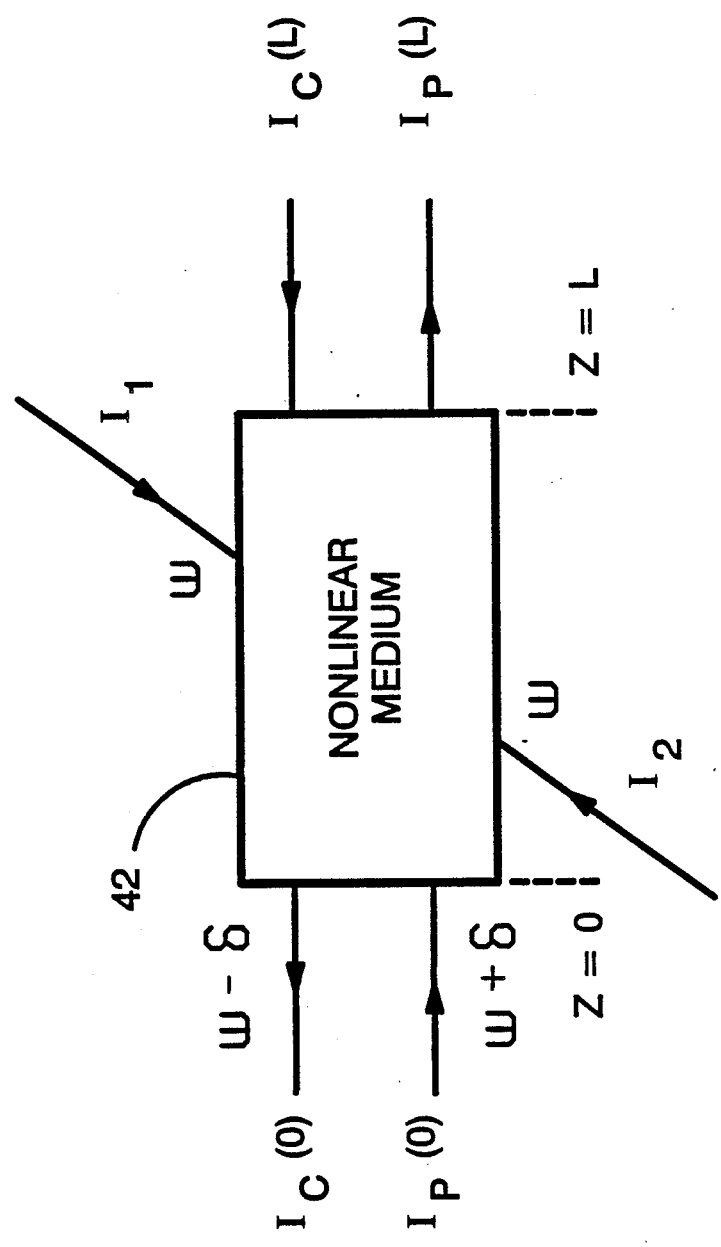
FIG. 4 is a definition of the component waves in a typical four wave mixing geometry.

The basic principles of four wave mixing were developed over the past decade and are utilized herein to demonstrate the feasibility and practicality of the present invention, as well as to provide an understanding of the characteristics which distinguish this invention from prior art. FIG. 4 shows the most general geometry for the non-degenerate four wave mixing (NFWM) process, wherein $Z=0$ defines the entry facet of the phase conjugating material and $Z=L$ defines the back facet of the material of thickness L. Two relatively intense counter-propagating "pump" beams set up an effective grating in the non-linear material. A third "probe" wave, $I_p(O)$, scatters off of this grating, creating the fourth wave, $I_c(O)$, or conjugate beam. When the probe wave is at a slightly different frequency $(\omega + \delta)$ than the pump waves (non-degenerate case), the conjugate wave appears at a third distinct frequency $(\omega - \delta)$, which can allow separation of probe and conjugate beams by filters, as well as by angular offsets. For the most general case (NFWM), the reflectivity $\eta \equiv I_c/I_p$ can be written as $$\eta = \frac{|\gamma L|^2 \tan^2(\beta L)}{|\gamma L|^2 + \left(dk\frac{L}{2}\right)^2 \sec^2(\beta L)}$$

where $$\gamma = \frac{2\pi}{n\epsilon_o\lambda}\sqrt{\frac{\mu}{\epsilon}}\chi_3\sqrt{I_1 I_2}$$

$$dk = 2n\pi|d\lambda|/\lambda^2 = 2n|\delta|/c$$

$$\beta = \sqrt{\gamma^2 + (dk/2)^2}$$

In the weak coupling approximation $(\gamma/dk < < 1)$, the reflectivity becomes ("Optical Phase Conjugation," R. Fisher, Ed., Academic Press, N.Y. 1983, pg. 45) simply $$\eta \to |\gamma L|^2 \left[\sin\left(dk\frac{L}{2}\right)\right]^2 / \left(dk\frac{L}{2}\right)^2$$

Figure 5A:
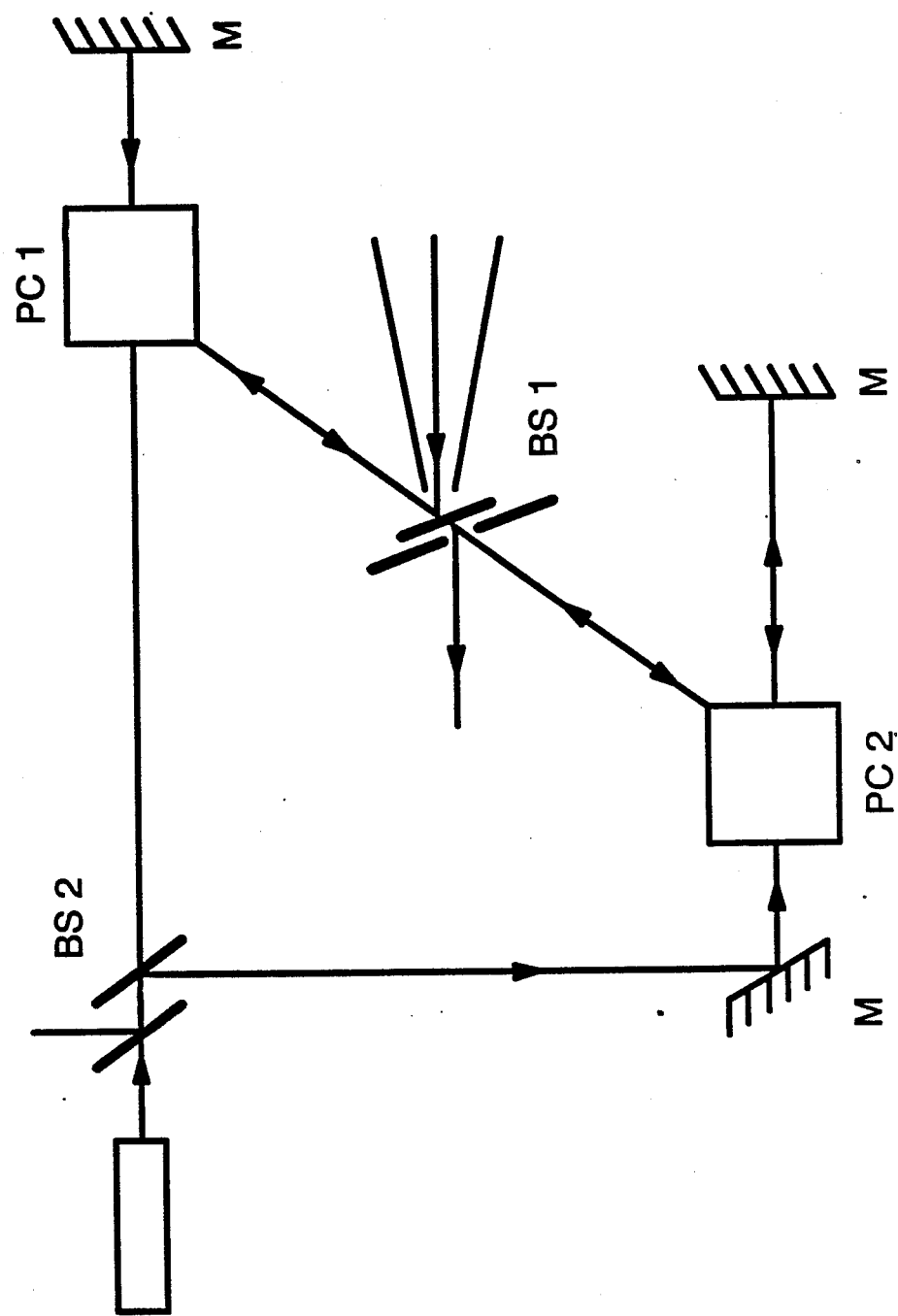
FIG. 5A is an optical layout for a resonator/amplifier configuration to be used prior to the aberration correction subsystem when low intensity image beams are present.
Figure 5B:
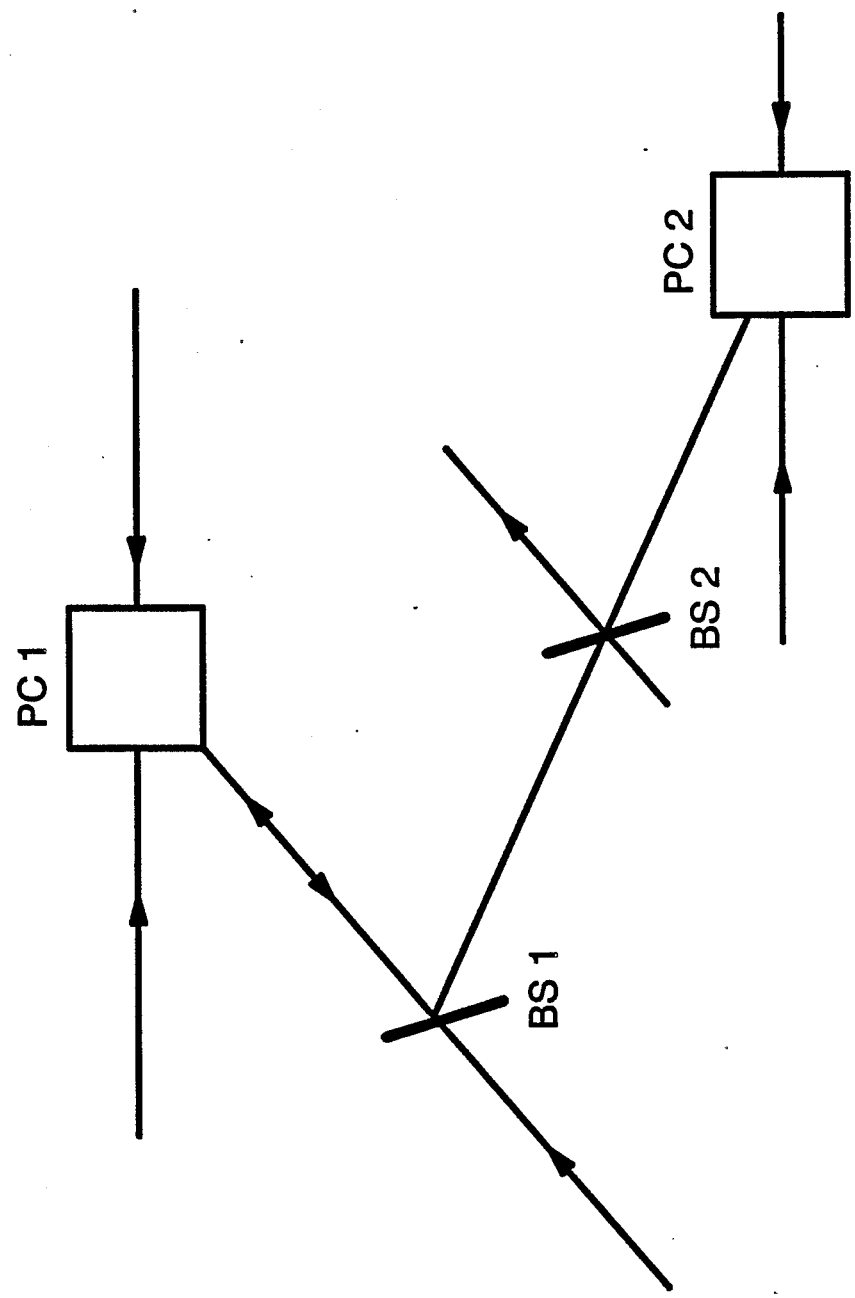
FIG. 5B is a two-stage amplifier configuration for a four wave mixing image beam amplifier to be used prior to the aberration correction subsystem when low intensity image beams are present.

Thus, for a degenerate FWM case with perfect alignment, $\eta \simeq (\gamma L)^2$. This relation allows an estimate of the pump intensities required for high reflectivity (i.e., $\gamma L \simeq 1$). For example, if $CS_2$ is the non-linear medium $(\chi_3 \simeq 1.6 \times 10^{-12}$ esu) with L=10 cm at $\lambda = 10^{-6}$m, then pump intensities of the order of $50 \times 10^6$ w/cm$^2$ are required for high reflectivity. The reflectivity needed will depend on the intensity of the image beam and the noise characteristics of the image detection system. If a photorefractive material such as $B_aTiO_3$ ($\chi_3 \simeq 6 \times 10^{-6}$ esu) is used with $\lambda = 0.5 \times 10^{-6}$ m and I=1 cm, then pump intensities of the order of 5 w/cm$^2$ are required for $\eta \simeq 1$. Higher non-linear susceptibility values can be achieved by use of materials at spectral regions near resonant transfers, such as atomic transitions and semiconductor valance/conduction band transitions, or photorefractive materials with large electro-optic coefficients. In the configuration shown in FIG. 3, the signal or image beam is used as a pump beam; due to the requirements for high intensity pumps for good FWM reflectivity, this geometry will be appropriate for actively illuminated targets (i.e., by a laser) at ranges of the order of $<10^3$ kilometers. For example, a 10 meter diameter telescope observing a target at a range $Z = 10^6$ meters would require an illuminator of approximately 100 kw average power operating at a 1μsec/1 Hertz duty cycle to provide a 1 watt collected image beam for the FWM subsystem pump beam. The other pump beam is provided by either the additional illuminator laser or a pick-off beam from the telescope reference laser (coherence lengths must be adequate for the path lengths); in either case this second pump is easily provided at modest powers of a few watts. It is possible to get good correction of aberrations when the pump beams are not of equal intensity, as in the above calculation. Since $\eta$ is proportional to the product of the two intensities ($I_1 I_2$), the local pump beam may be increased in intensity to compensate for a low image beam intensity; this will cause some degradation in image quality but may relax illuminator requirements sufficiently to warrant this approach. Another approach is to amplify the image beam (using a separate FWM system) prior to the aberration correction subsystem. Two representative amplifiers are shown in FIGS. 5A and 5B the bottom schematic (5B) represents a double amplification configuration, and the top geometry (5A) is a phase conjugate resonator with an input seed beam provided by the beam splitter BS1, which also functions as an outcoupler. The input beam to the resonator is brought to a Gaussian waist at BS1 by a lens; the spatial filter (with aperature of the order of the waist diameter) helps reduce stray scattered pump beam radiation from reaching the opposite phase conjugators (PC1, PC2). Both these configurations should provide an amplified image wave of suitable intensity for correcting the phase aberrations utilizing the FWM schemes presented herein.

Figure 6:
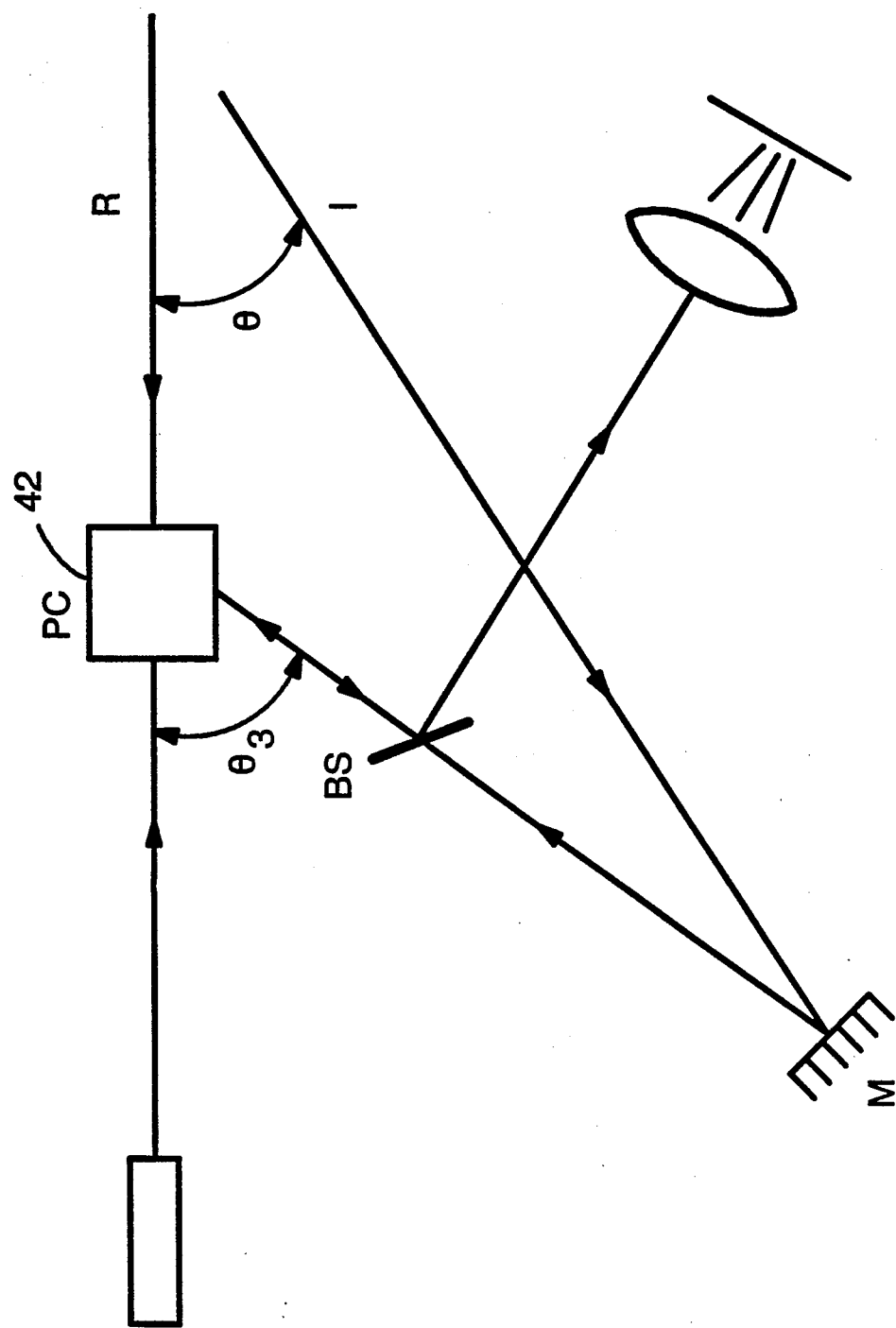
FIG. 6 is an optical configuration to be utilized with low power image beams in which the aberrated low power image beam acts as the probe wave while the aberrated reference beam acts as one of the pump beams.

For low image beam intensities, the configuration shown in FIG. 6 is applicable. Here the reference beam is used as one of the pump waves. This yields a conjugate wave $IC = \chi_3(P)(Re^{i\phi})I^* e^{-i\phi} = (\chi_3 PR) I^*$, which is the unaberrated image, but conjugated. This can still be brought to a focal plane with proper optics to yield an image with the telescope aberrations removed. Now control of the pump beam intensities and coherence is easily accomplished; since both can be local to the telescope and will not suffer any loss in power due to transmission over large distances. This is the preferred configuration for passive surveillance/astronomy applications, where the image beam is photon limited.

Consider next the alignment tolerances and effects of misaligned or offset pump beams. The phase matching conditions have been developed ("Principles of Phase Conjugation," B. Ya. Zel'dovich, et. al., Springer-Verlag, Berlin, 1983, p. 150) and are $$\Delta\omega = \pi\omega\cos\theta/kL$$

$$\Delta\theta_3 = \frac{2\pi}{kL\alpha\sin\beta} \text{ (half-widths)}$$

where $L\cos\theta$ is the path of the probe beam in the interaction region and $\alpha$ is the fractional k-vector mismatch $(\vec{k}_1 + \vec{k}_2)/k = \vec{\alpha}$ and $\beta$ is the angle of the probe beam $(\vec{k}_3)$ makes with the vector $-\vec{\alpha}$. When the pump beams are perfectly aligned and copropagating, $\alpha=0$ and $\Delta\theta_3$ becomes infinite; i.e., the probe beam can be at any angle to the pump beams and the conjugate beam return is in the opposite direction to the probe wave when all beams are at the same frequency $\omega$. Note that $\Delta\theta_3$ is a measure of how fast the conjugate reflectivity goes to zero as the view angle changes from the phase-matched condition. The conjugate beam makes an angle $\psi=\alpha\sin\beta$ with respect to the direction $-\bar{k}_3$ (opposite to the probe beam input direction); at this angle the reflectivity $\eta$ is a maximum for a given value of $\bar{\alpha}$.

The implications of these alignment equations on the design of a practical system is as follows. One option for a compact system with good pump/probe separation is to utilize a tightly aligned pump geometry (subject to practical tolerances) in which $\alpha$ is made as small as practical. For example, if a pump beam alignment tolerance of 1 milliradian ($\alpha \simeq 10^{-3}$) is chosen and a probe/pump angle of $\theta_3=5°$ is utilized, then a reasonably compact FWM subsystem is possible with good angular clearances for beam elements such as beam splitters, lens, etc. In this case, the angular sensitivity of the probe direction $\Delta\theta_3$ becomes $\Delta\theta_3 \simeq 0.07 = 4°$ for $\lambda=6300\text{Å}$ and a 1 cm mixing region. This s a reasonably large angular tolerance and presents no alignment difficulties. Probe phase sampling should be faithful to $\cos\theta_3 \simeq 99 + \%$. The image-bearing conjugate beam is optimal at an angle $\psi=5\times10^{-4} \simeq 0.03°$ to the probe beam. Thus, separation of the probe/conjugate beams will require a beam splitter, polarization, or frequency filter techniques. A beam splitter technique (FIG. 3) is simplest and frequently used in other FWM applications. Another approach is to attempt to separate all the beams by creating a relatively large pump beam misalignment. If $\beta \simeq 89°$, $\theta_3 \simeq 1°$, and $\alpha=\sin\theta_3 \simeq 0.0175$, then $\Delta\theta_3=3.6\times10^{-3} \simeq 0.2°$ and the conjugate beam direction must be well maintained. The conjugate wave makes an angle $\psi=0.0175(.999) \simeq 0.0175 \simeq 1°$. Thus, we now have a 1° angular separation between pump and probe beams and between probe and conjugate beams. At distances of the order of a few meters, this translates to separations of the order of 5 cm, enough for turning mirrors, splitters, etc.

Figure 7:
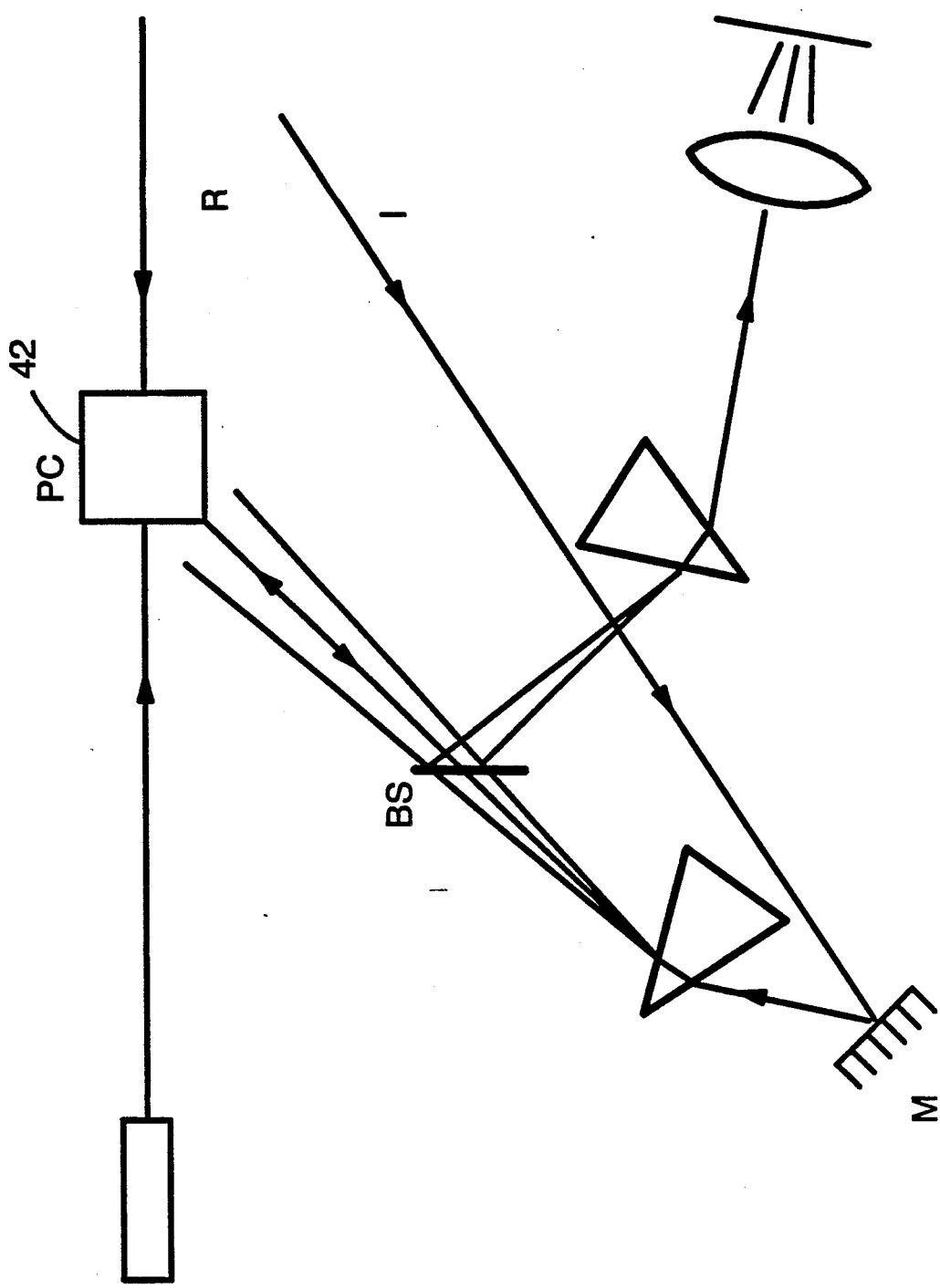
FIG. 7 is an optical configuration to produce a broad band aberration correction subsystem in which a dispersive element causes images at different frequencies to enter the non-linear material at slightly different angles to allow phase matching conditions to exist and therefore provide good conjugate reflectivity over a broader bandwidth.

Another issue that needs to be considered in a practical telescope system is the bandwidth limitations of the FWM process and its impact on the image formation and detection process. First, reference and pump beam coherence is necessary over the path lengths in the telescope optical train. The coherence length of a beam is defined as $l_c=c/dv$ where $dv$ is the frequency spread in the beam. If the reference and pump laser line widths are kept at $dv \simeq 10^6$ Hz, then the coherence length is of the order of $l_c \simeq 3\times10^8/10^6 \simeq 300$ meters, adequate for telescopes in the 10 meter diameter range. These line widths are easily achieved with present lasers in selected spectral regions (i.e., $CO_2$ laser @ 10$\mu$m, etc.). However, the narrow line widths required for FWM processes presents a severe limitation on low incensity broadband image wave fronts since the number of photons collected after the FWM subsystem is proportional to $I(v) dv$. With active illumination surveillance systems, this problem is not severe since the illuminating laser bandwidth can be chosen to match the FWM subsystem bandpass and thereby all the image photons will be utilized. Note that the bandpass $dkL/2 \simeq \pi$ yields a value of $\Delta\lambda$ from $$\frac{\pi d\lambda L}{\lambda^2}$$

of $\sim 0.1\text{Å}$ or a frequency band $dv \simeq 5$ GHz, which is much larger than the pump beam linewidths, so that the conjugate reflectivity $\eta$ is at a maximum. For broadband passive imaging, other techniques are needed to boost the photon spectral transmission efficiency of the FWM subsystem. One method to increase bandwidth is to utilize pump and reference lasers with multi-line/multi-mode capability with mode separations greater than $dv$. This will have the effect of sampling the input spectrum at say 10 MHz line widths every 1 GHz interval, giving a duty cycle of 1% over a broad bandwidth capability inherent in the pump/reference laser system. This may restrict the FWM material to a non-resonant broad-band type transition, such as the photorefractive systems. Another approach is to utilize the angular sensitivity of the input probe beam by spectrally dispersing the input beam so that different frequency components of the image beam enter the phase conjugating material at slightly different angles, such that the grating spacing written by the pump beams is seen at the proper angle for high reflectivity for that wavelength. FIG. 7 shows a configuration for use of broadband probe/conjugate beams.

Another consideration in the design of practical FWM telescope systems is the trade-off between high conjugate reflectivity and response time. There is an empirical trend (Jain, Optical Engineering, 21(2), 1982, p. 210) between $\chi_3$ and $\tau$, the "speed" or response time of the material. As a rough approximation $\chi_3/\tau \simeq 10^5$ at fixed wavelength. Since most large optical structures will have vibration-induced aberrations which should be corrected by the FWM subsystem, the response time of the FWM material should be faster than the highest significant frequency with large amplitude vibrations. Assuming structural vibrations of the order of kiloHertz, response times $\tau < 10^{-3}$ sec are required. This level is near the limit of photorefractive materials. Other applications may require image sampling at faster rates, due to changes in the target/object environment. This may require use of faster FWM materials at the expense of reflectivity or signal strength.

It is therefore apparent that practical configurations of this invention must be carefully tailored to the specific application or mission, but the basic principles described herein are applicable to all these configurations or variations.

Specifically, what is claimed is:

1. An aberration correction imaging device, in which an object beam of electromagnetic radiation and an aberration-sampling reference beam both make a single pass through the aberrations present in said device and interact with an unaberrated reference beam in a phase conjugating medium, producing as output an unaberrated image beam, said device comprising: said phase conjugating medium; means for producing reference beams; means for receiving the incident object beam and the aberration-sampling reference beam onto optical components having aberrations; means for directing the resulting aberrated object beam, the aberration-sampling reference beam and the unaberrated reference beam onto said phase conjugating medium to thereby produce the output unaberrated image beam, and means for separating the unaberrated image beam from the aberration-sampling reference beam and the unaberrated reference beam, said means for separating utilizing differences in angular direction, polarization, or wavelength between the unaberrated output image beam from the reference beams.

2. An imaging device according to claim 1 in which the receiving means is a large primary mirror and wherein the imaging device is an imaging telescope and the local aberration-sampling reference beam is produced by a laser source mounted on the telescope the source being located at a distance of five or more focal lengths from the primary mirror and fully illuminating the primary mirror.

3. A telescope according to claim 2 in which the aberration-sampling reference wave bearing the telescope aberrations is injected as the probe wave in the phase conjugating medium, with the aberrated object beam and the unaberrated reference beam acting as pump beams, and the output unaberrated image beam is a reflected conjugate beam of this probe wave.

4. A telescope according to claim 2 in which the aberrated object beam is injected as the probe wave, with the aberrated and the unaberrated reference beams acting as pump beams, and the output unaberrated image beam is a reflected conjugate beam of the probe wave.

5. A telescope according to claim 2 in which a second four wave mixing (FWM) or phase conjugating system is provided to function as an amplifier or as a phase conjugating resonator oscillator/amplifier consisting of two high reflectivity phase conjugate mirrors aligned to form a resonant cavity, to increase the power of the object beam while retaining all phase information present in the object beam.

6. A telescope according to claim 2 in which the laser source is a narrow band illuminator laser source, and including a beam splitter to provide a target return signal of sufficient intensity that the phase conjugate output unaberrated image beam can be extracted from substantial background noise.

7. A telescope according to claim 2 in which the means for producing beams produces broad band beams and further comprising means for dispersing the object beam or the reference beams entering the phase conjugating medium.

8. A device according to claim 1 in which the input object beam and the reference beams are in the non-visible region of the electromagnetic spectrum.

* * * * *